United States Patent [19]

Leatherman

[11] 3,996,082
[45] Dec. 7, 1976

[54] COMPOSITE BONDING METHOD AND MEANS

[75] Inventor: Alfred F. Leatherman, Columbus, Ohio

[73] Assignee: William C. Heller, Jr., Milwaukee, Wis.

[22] Filed: Aug. 14, 1975

[21] Appl. No.: 604,832

[52] U.S. Cl. .............................. 156/73.5; 156/82; 156/276; 156/309; 428/228; 428/285; 428/420
[51] Int. Cl.² ........................................ B29C 27/04
[58] Field of Search .......... 156/309, 310, 313, 315, 156/73.5, 82, 308, 276; 428/262, 212, 297, 228, 285, 420

[56] References Cited
UNITED STATES PATENTS

| | | | |
|---|---|---|---|
| 3,198,692 | 8/1965 | Bridgeford | 428/420 |
| 3,687,764 | 8/1972 | Rogosch et al. | 156/309 |
| 3,721,597 | 3/1973 | Colburn | 156/309 |
| 3,900,360 | 8/1975 | Leatherman | 156/310 |

*Primary Examiner*—James J. Bell
*Attorney, Agent, or Firm*—Andrus, Sceales, Starke & Sawall

[57] ABSTRACT

A stratified structure suitable for joining first and second thermally bondable bodies exhibiting bonding incompatibility. The structure includes a first layer having bonding compatibility with a first of the bodies, a second material layer having bonding compatibility with a second of the bodies and a fibrous stratum interposed between the first and second layers for providing internal cohesion and integrity to the bonding agent by a mechanical interlocking action. In bonding the first and second bodies, the composite bonding agent is positioned between the two bodies and a heat seal effected between the bodies and the agent and thus between the two bodies.

7 Claims, 7 Drawing Figures

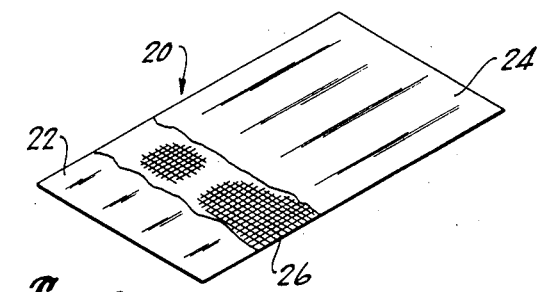
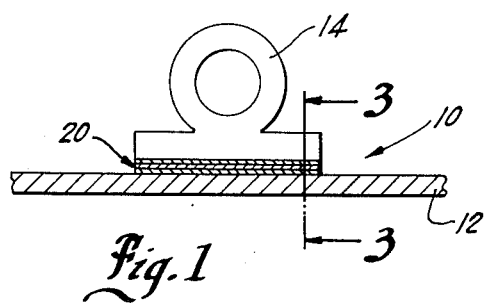
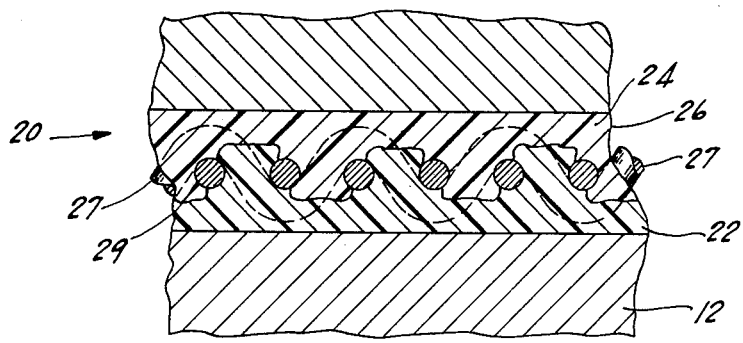
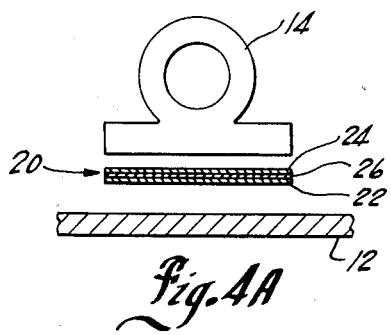
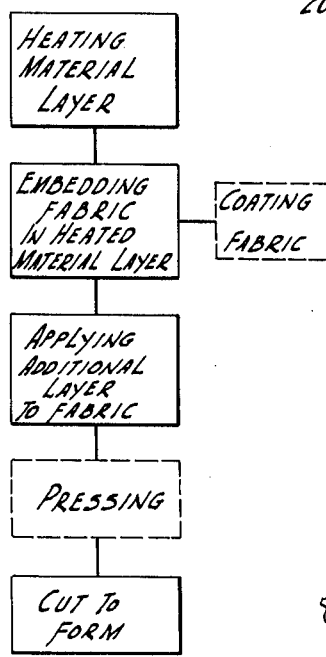
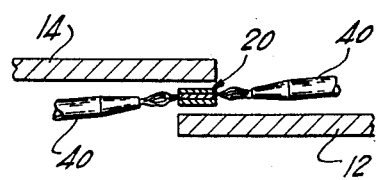
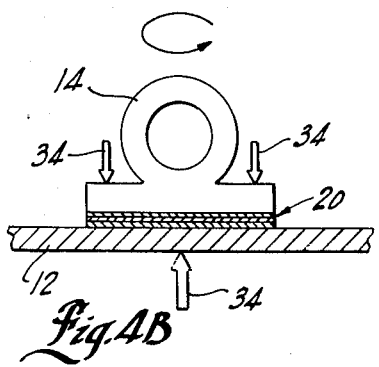

COMPOSITE BONDING METHOD AND MEANS

BACKGROUND OF THE INVENTION

1. Field of the Invention

The present invention relates to stratified structures for bonding plastic materials.

2. Description of the Prior Art

In recent years, the greater understanding of structure-property relationships of plastic materials and the introduction of new polymerization techniques and monomers have resulted in the availability of a large number of different types of plastics having a wide variety of properties. Plastic materials can be produced with the ideal properties necessary for a specified application. For instance; plastics may be hard or soft; rigid or flexible, rubbery, leathery, or glassy; porous or non porous; transparent or pigmented; thermosetting or thermoplastic, etc. These varying properties result from differences in chemical composition, atomic arrangement, molecular weight, and other structural aspects of the plastics.

In many instances, plastics having diverse properties are incorporated in a single plastic article. For example, a plastic package may include a transparent rigid window portion formed of polymethacrylate mounted on an opaque, tough housing of reclaimed non transparent polyvinyl chloride. The latter material is low in cost but does not offer the necessary transparent qualities.

In another application, it may be desired to provide fasteners on a polypropylene sheet. While the fasteners may be injection molded during the formation of the sheet, such as process leaves a dent on the side of the sheet opposite the fastener. Further, a fastener formed of polypropylene may not have the necessary mechanical strength. It is therefore preferable to affix a nylon fastener to the polypropylene sheet.

In other applications, parts of an article may be porous while other parts are non porous. The fabrication of such articles may be accomplished by numerous, available techniques, such as the use of adhesives, mechanical fasteners, and the like.

However, it is often difficult to find an adhesive which will bond article portions of dissimilar property plastics. The use of adhesives may lead to the contamination of the contents of plastic container articles. With mechanical fasteners, hermetic bonds may be impossible to obtain.

A preferable method of assembling plastic articles utilizes the thermal properties of the plastics to effect joinder. For example, the abutting portions of two plastic article portions may be heated to fusion temperature and then pressed together to effect a heat seal between the portions.

However, the differing structure and properties of the plastics often cause a greater or lesser degree of thermal bonding incompatibility between the materials which prevents formation of a satisfactory heat seal. This phenomenon has proven particularly troublesome in the fabrication of articles having portions of differing plastic materials and is proving to be an even greater impediment to fabrication as the number of diverse property and structure plastics continues to increase. Further, in cases in which a usable heat seal can be effected, this seal may be subsequently rendered ineffectual by conditions to which the article is exposed in use, such as oxidizing or temperature conditions.

SUMMARY OF THE PRESENT INVENTION

It is, therefore, the object of the present invention to provide a means and method for thermally joining plastic or plastic coated elements exhibiting mutual bonding incompatibility.

The present invention contemplates the use of a composite bonding agent imbued with sufficient compatibility toward each of the elements to effect a thermal heat seal between the agent and each of the elements, and thus between the two elements.

It is a further object of the present invention to provide a composite bonding agent and method employing same for providing high strength joinder of diverse property and structure plastics in a rapid and inexpensive fashion.

It is a further object of the present invention to provide such a composite bonding agent which has sufficient internal or cohesive strength to obviate failure of the heat seal between the elements in the bonding agent. The internal cohesive strength of the composite bonding agent at least equals, and in most cases exceeds, the strength of the bond between the agent and the elements.

Briefly, the aforementioned composite bonding agent comprises a stratified structure including a first material layer having a bonding compatibility with the plastic of one of the elements and a second material layer having a bonding compatibility with the plastic of the other elements. The composite bonding agent is bound into an integral cohesive mass, and any incompatibility which may exist between the layers of the agent overcome, by the incorporation of a high strength fabric, typically of glass fibers, between the layers. The internal cohesive strength of the agent is obtained by mechanical interlocking of the layers to the fabric rather than by adhesion. The properties of the agent are also enhanced by the reinforcement provided by the strength of the fabric. Thus, any incompatibility which exists in the overall bond between the two elements occurs where reinforcement in the form of the high strength fabric is available and the effects of such incompatibility are effectively negated. The absence of any particulate dispersion in either or both of the layers further adds to the strength of the bonding agent, as well as lowering its cost.

The composite bonding agent so formed is usable in a bonding process in which the thermally bondable plastic or plastic coated elements to be joined are juxtapositioned with the composite bonding agent between them. The composite bonding agent is positioned so that the layers are adjacent the elements with which they have bonding compatibility. The plastic elements and the composite bonding agent are then subjected to heat to raise the agent and the adjacent portions of the elements to heat sealing temperatures. The elements and the agent are brought together to affect a heat seal between the plastics of the two elements and the composite bonding agent and thus between the two elements.

A method for making the composite bonding agent having the properties, and usable in the method, described above typically includes the steps of providing a first material layer having bonding compatibility with one of the thermally bondable plastic or plastic coated elements, heating the first material layer to plasticity, impressing the fabric for providing internal cohesion to the bonding agent into an exposed surface of the first material layer to mechanically join the first layer to the fabric, and applying a second material layer having bonding compatibility with the other thermally bondable plastic or plastic coated elements to the fabric to mechanically join the second layer to the fabric. One or both of the layers may be coated on the fabric as a liquid.

BRIEF DESCRIPTION OF THE DRAWINGS

FIG. 1 is a cross sectional view of a portion of a thermoplastic article formed with the composite bonding agent and method of the present invention.

FIG. 2 is a partially cut away perspective view of the composite bonding agent of the present invention showing the various elements thereof.

FIG. 3 is an enlarged partial cross sectional view of the composite bonding agent of the present invention taken along the line 3—3 of FIG. 1.

FIGS. 4a and 4b are partial cross sectional views of the thermoplastic article of FIG. 1 illustrating a method employing the composite bonding agent shown in FIGS. 2 and 3.

FIG. 5 is a partial side view of another embodiment of a method employing a composite bonding agent.

FIG. 6 is a block diagram illustrating the method of the present invention for manufacturing the composite bonding agent.

DESCRIPTION OF THE PREFERRED EMBODIMENT

In FIG. 1 there is shown a multi-piece plastic article 10. Article 10 includes a sheet 12 which, for purposes of illustration, may be assumed to be formed of polypropylene. Article 10 also includes fastener 14 shown illustratively as an eye. Fastener 14 may be formed of high strength plastic materials, for example, nylon.

Polypropylene sheet 12 and nylon fastener 14 must be joined together. As noted supra, because of the differences in the structure and properties of polypropylene and nylon, a seal between the two elements having the necessary strength and other properties has been difficult to obtain in the past.

In accordance with the present invention, a composite bonding agent 20 is employed to effect the seal between sheet 12 and fastener 14. Composite bonding agent 20 is shown in greater detail in FIGS. 2 and 3. As shown therein, composite bonding agent 20 is a multi-layer or stratified structure. In the orientation shown in the Figures, a bottom layer 22 is comprised of a thermoplastic material which exhibits a high degree of bonding compatibility with the polypropylene material of sheet 12. Such compatibility may be evidenced by mutual soluability, similarity in heat sealing temperatures, and similar properties. For example, layer 22 may be formed of polypropylene sheeting having properties similar or identical to those of the material of sheet 12. The sheeting may be flexible or rigid, as desired.

The upper layer 24 of composite bonding agent is formed of a thermoplastic material which exhibits a high degree of bonding compatibility with the nylon of fastener 14. For example, layer 24 may be formed of a nylon material having properties similar or identical to those of the material or fastener.

Interposed between layers 22 and 24 is a means for providing cohesiveness to composite bonding agent 20. This means may comprise an open fabric 26 having high strength properties with respect to the materials of layers 22 and 24. Fabric 26 may typically be formed of strands 27 of glass fibers 29 or the like.

Layers 22 and 24 are coupled to the strands 27 by flowing into the mesh and around the strands of fabric 26. The layers engage the strands for over one half their circumferences so as to resist separation of the layers and the fabric. The surface elevation and depressions typical of a woven fabric caused by the crossing of the strands permit each layer to grip the raised strands on the side of the fabric adjacent it. In many cases the strands will be mechanically submerged in one or both of the layers so as to be encapsulated by the layers to further assist in the joinder of the layers. The cohesion obtained in composite bonding agent 20 is thus procured by mechanical interlocking the layers in the strands 27 of fabric 26. Any incompatibility in the joinder of layers 22 and 24 is thus reinforced by the presence of fabric 26. In use, the high strength of fabric 26 serves to absorb the forces exerted on bonding agent 20 thus leaving layers 22 and 24 free to perform their bonding function. The mechanical interlocking of layers 22 and 24 and fabric 26 is aided by whatever direct bonding between the materials of layers 22 and 24 which may occur in the interstices and elsewhere in screen 26. However, the main joinder action is that of the mechanical interlocking.

The degree of reinforcement provided by the presence of fabric 26 may be controlled by selection of the type of fabric, the size of the interstices between the strands of the fabric, the thickness of the strands with respect to the interstices, and the type of weave used to form the fabric. An open weave has been found more suitable to the practice of the present invention than a tight weave.

If desired the strands 27 of fabric 26 may be coated with the plastics of layers 22 and 24 prior to weaving to enhance the flow of the layers around the fabric. For example, prior to weaving fabric 26, the weft may be coated with the polypropylene of layer 22, as by extrusion, while the warp is coated with the nylon of layer 24. Fabric 26 is then woven and applied between layers 22 and 24.

To form article 10, sheet 12 and fastener 14 are juxtapositioned so that the surfaces to be sealed are in opposing relationship. Composite bonding agent 20 is inserted between the opposing surfaces, as shown in FIG. 4a, with layer 24 facing fastener 14 and layer 22 facing sheet 12.

For exemplary purposes, the formation of article 10 will be illustrated as accomplished by friction or spin welding. Fastener 14 and composite bonding agent 20 are held together and means are provided to commence the frictional engagement or rotation of lid 14 and composite bonding agent 20. Thereafter, the rotating composite bonding agent 20 is brought into contact with the surface of sheet 12. The friction between composite bonding agent 20 and sheet 12 causes the contacting surfaces to become tacky or viscid. Thereafter, composite bonding agent 20 and sheet 12 are held together while the spinning of fastener 14 is continued, causing the contacting surfaces of composite bonding agent 20 and fastener 14 to become viscid. Thereafter, spinning is stopped and pressure applied normal to the bonding surfaces seals fastener 14, composite bonding agent 20 and sheet 12 into the completed article 10.

In the completed joint, the bonding compatibility existing between sheet 12 and layer 22 and fastener 14 and layer 24 insures a high strength between these elements. Fabric 26 reinforces composite bonding agent 20 to lend commensurate strength to the bonding agent itself.

It will be appreciated that other techniques may be used to obtain thermal bonds between composite bonding agent 20 and the article portions. For example, heated platens, hot gas, infrared radiation and ultrasonic energy may be utilized. The use of hot gas is shown in FIG. 5.

A method for forming composite bonding agent 20 is shown in flow diagram form in FIG. 6. One of layers 22 or 24 may be heated to a point of softening as by laying it on a heated plate or by other means.

Fabric 26 is laid on the softened surface of the heated material layer. Fabric 26 may be pre-coated with the layer materials as noted above. If the fabric is formed of glass fibers, the flow of the layer material around the strands may be aided by the addition of silane (aminopropyltriethoxysilane) to the glass fibers. Depending on the degree of softening, fabric 26 may partially sink into the layer by its own weight to provide the desired mechanical attachment with the layer. If the desired interlocking is not thus obtained, the fabric 26 may be pressed into the layer to the necessary extent by a diffused force applied normal to the surface of the layer.

The second layer, such as layer 24, is then applied to the remaining exposed surface of fabric 26. This may be done in any convenient manner compatible with mechanical and thermal properties of the materials of the layers. Casting or extrusion coating may be employed. Coating, as by brushing, may also be employed. In connection with the polypropylenenylon example described above, the composite bonding agent may be formed by heating a sheet of polypropylene and pressing the fabric into its softened surface. The nylon material may be thermally softened and applied to the exposed surface of the fabric. The nylon material may also be applied by coating the exposed surface of the fabric with a solution of nylon in a solvent. This secures better penetration of the nylon material into the fabric but the strength of the resulting bonding agent is not quite as high as when the nylon material is melted and applied to the fabric.

If the resulting composite bonding agent 20 is thicker than desired, the composite may be hot pressed to a thinner and more uniform thickness. The completed composite bonding agent 20 is then cut into the desired form necessary for the bonding application, such as the strips shown in FIGS. 1 and 4.

It will be appreciated that numerous modifications of the above described invention may be made. The exact formulation of layers 22 and 24 may be selected to suit specific bonding applications and may comprise, but are not limited to, various combinations of ABS (acrylonitrile-butadiene-styrene), acetals, acrylics, allyl resins and monomers, cellulosics, chlorinated polyethers, fluoroplastics, nylon, polycarbonates, polyesters, polyethylene, polypropylene, polyurethane, polybutylene, and vinyl polymers and copolymers.

In certain applications it may be desirable to utilize a fabric 26 formed of a plurality of unwoven parallel and overlapping strands, i.e. a roving, or a knit fabric, as well as a woven fabric.

One or both of layers 22 and 24 may be provided with a coloring agent from a wide range of pigments, so as to make the composite bonding agent the same color as the article portions being joined or to distinguish the bond by its color from the article portions. Coloring of one or both of layers 22 and 24 may be used as an indication of the orientation of the layers and their compatibility properties to an operator utilizing the agent.

Various modes of carrying out the invention are contemplated as being within the scope of the following claims particularly pointing out and distinctly claiming the subject matter which is regarded as the invention.

I claim:

1. A process for joining first and second thermally bondable bodies exhibiting at least some mutual fusion bonding incompatibility by means of a composite bonding agent including first and second thermoplastic material layers joined at least in part by mechanical engagement with a medial fibrous stratum, said first and second thermoplastic material layers having fusion bonding compatibility with said first and second bodies, respectively, and bonding compatibility with each other, said method comprising the steps of:

juxtapositioning the first and second bodies so that the portions thereof to be bonded are contiguous;

inserting the bonding agent between the bodies with the thermoplastic material layers adjacent the bodies with which they have bonding compatibility;

heating at least one of the composite bonding agent and adjacent portion of the bodies to a thermally fusible state by generating a temperature increase initially only at the exterior surface of at least one of the agent and portions; and bringing said first and second bodies into abutment with said composite bonding agent to form fusion bonds with said first and second material layers, respectively.

2. The method according to claim 1 further defined as applying pressure normal to the area of fusion bonding at least subsequent to heating the composite bonding agent and bodies.

3. The method according to claim 1 including the terminal step of cooling the first and second bodies and the composite bonding agent to fully form the fusion bond.

4. The method according to claim 1 wherein the heating step is further defined as heating the agent and portions by frictional engagement of the exterior surfaces of the agent and portions.

5. The method according to claim 1 wherein the heating step is further defined as heating the agent and portions by rotational frictional engagement of the exterior surfaces of the agent and portions.

6. The method according to claim 5 wherein the heating step is further defined as frictionally rotating the bonding agent with respect to one of said bodies for heating the bonding agent and adjacent portion of the one of said bodies to fusion bonding temperatures and forming a fusion bond between the bonding agent and body and thereafter frictionally rotating the bonding agent with respect to the other of said bodies for heating the bonding agent and the adjacent portion of the other of said bodies to fusion bonding temperatures and forming a fusion bond between the bonding agent and the body.

7. The method according to claim 6 wherein the heating step is further defined as restraining rotation of the bonding agent with respect to the other of said bodies while permitting frictional rotation with respect to the one of said bodies and thereafter frictionally rotating the bonding agent having the one of said bodies fusion bonded thereto with respect to the other of said bodies.

* * * * *

UNITED STATES PATENT AND TRADEMARK OFFICE
CERTIFICATE OF CORRECTION

PATENT NO. : 3,996,082
DATED : December 7, 1976
INVENTOR(S) : Alfred F. Leatherman It is certified that error appears in the above-identified patent and that said Letters Patent are hereby corrected as shown below:

Column 1, Line 34, Cancel "as" and substitute therefor ---a---

Column 3, Line 53, Cancel "soluability" and substitute therefor ---solubility----

Column 6, Line 17, To the word "compatibility" add the prefix ---in---

Signed and Sealed this

Thirteenth Day of September 1977

[SEAL]

Attest:

RUTH C. MASON
Attesting Officer

LUTRELLE F. PARKER
Acting Commissioner of Patents and Trademarks